(12) United States Patent
Lanzkron et al.

(10) Patent No.: US 8,745,600 B2
(45) Date of Patent: Jun. 3, 2014

(54) INSERTING TEST SCRIPTS

(75) Inventors: Mordechai Lanzkron, Kfar Etzion (IL); Dror Saaroni, Yahud (IL); Niv Lederer, Ness Ziona (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 179 days.

(21) Appl. No.: 13/187,898

(22) Filed: Jul. 21, 2011

(65) Prior Publication Data
US 2013/0024845 A1 Jan. 24, 2013

(51) Int. Cl.
*G06F 9/44* (2006.01)

(52) U.S. Cl.
USPC .......................................... 717/135

(58) Field of Classification Search
USPC .................. 717/124, 127–128, 130, 135; 714/38.14, 38.12, 38.11, 32, 43; 709/224; 702/186; 455/423
See application file for complete search history.

(56) References Cited

U.S. PATENT DOCUMENTS

| | | | | |
|---|---|---|---|---|
| 6,006,260 | A * | 12/1999 | Barrick et al. | 709/224 |
| 6,944,660 | B2 * | 9/2005 | Eshghi et al. | 709/224 |
| 7,398,469 | B2 * | 7/2008 | Kisamore et al. | 715/704 |
| 7,543,188 | B2 * | 6/2009 | Devas et al. | 714/38.14 |
| 7,600,014 | B2 * | 10/2009 | Russell et al. | 709/224 |
| 7,877,681 | B2 | 1/2011 | Schwarzbauer | |
| 2002/0016937 | A1 * | 2/2002 | Houh | 714/43 |
| 2002/0165954 | A1 * | 11/2002 | Eshghi et al. | 709/224 |
| 2003/0135612 | A1 * | 7/2003 | Huntington et al. | 709/224 |
| 2006/0101404 | A1 * | 5/2006 | Popp et al. | 717/124 |
| 2007/0006036 | A1 * | 1/2007 | Devas et al. | 714/38 |
| 2010/0325615 | A1 * | 12/2010 | Ramot | 717/124 |

FOREIGN PATENT DOCUMENTS

KR 20080049976 6/2008

OTHER PUBLICATIONS http://cuite.codeplex.com/documentation.
http://delivery.acm.org.
http://www.opensourcetesting.org/functional.php.

* cited by examiner

*Primary Examiner* — Tuan A Vu
(74) *Attorney, Agent, or Firm* — Angela Mae Coxe

(57) ABSTRACT

A method and system to automatically insert a test script into a web application is provided. A web browser is monitored to detect the navigation in the web application. The test script is automatically inserted into the web application rendered on a web browser after a navigation is detected in the web application.

6 Claims, 5 Drawing Sheets

INSERTING TEST SCRIPTS

BACKGROUND

Web applications may be developed and tested. Scripts may be used to test the web applications. The scripts may be inserted into the web application to facilitate performing tests.

BRIEF DESCRIPTION OF THE DRAWINGS

Non-limiting examples of the present disclosure are described in the following description, read with reference to the figures attached hereto and do not limit the scope of the claims. In the figures, identical and similar structures, elements or parts thereof that appear in more than one figure are generally labeled with the same or similar references in the figures in which they appear. Dimensions of components and features illustrated in the figures are chosen primarily for convenience and clarity of presentation and are not necessarily to scale. Referring to the attached figures:

DETAILED DESCRIPTION

In the following detailed description, reference is made to the accompanying drawings which form a part hereof, and in which is illustrated by way of specific examples in which the present disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims.

Test scripts are often used to measure performance of web applications. For example, a user may run a JavaScript code at a specific time during a test. To run the JavaScript code at the specific time, the JavaScript code is inserted by the test, but the test itself is not pro-actively run.

In examples a method and system to automatically insert a test script into a web application rendered on a web browser is provided. A web browser is monitored to detect the navigation in the web application rendered in the web browser. The detection of navigation in the web application causes automatic insertion of the test script into the web application rendered on a web browser. Test scripts that are automatically inserted into the application program after a navigation of the web application, may run pro-actively without manual insertion of the test scripts.

Figure 1:
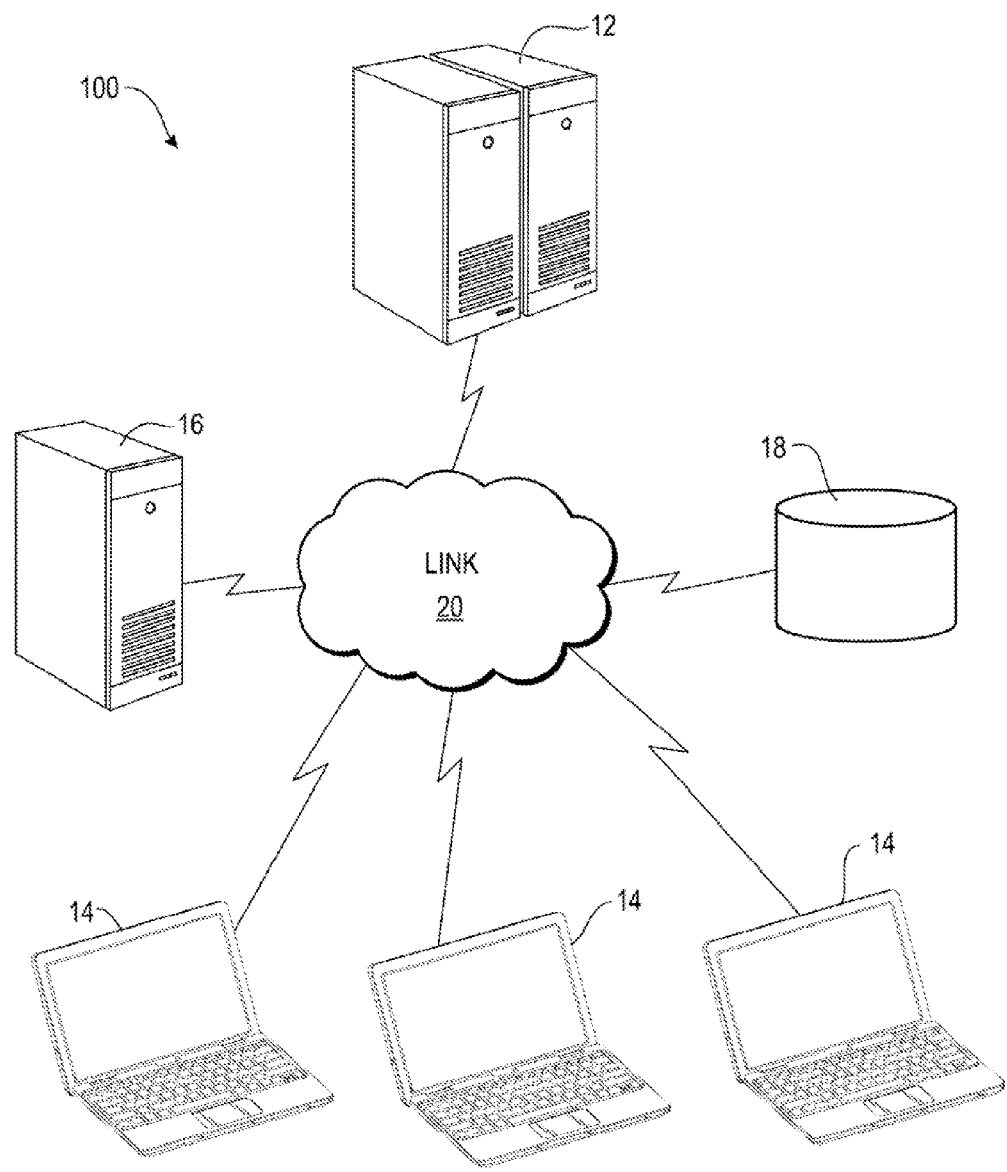
FIG. 1 illustrates a system according to an example.

FIG. 1 illustrates a system 100 according to an example. The system 100 includes an application device 12, client devices 14, a test device 16, and a data store 18 connected to each other via a link 20. The application device 12 represents generally any computing device or combination of computing devices configured to serve an application to client devices 14, such as Internet Explorer® and/or Mozilla Firefox®. The application device 12 may serve, for example, web applications. When serving web applications, the application device 12 provides the web browser in client devices 14 with the web applications as requested. Web applications refer to web pages, web sites with a plurality of web pages, web based applications and the like. For example, a web application may include a web site for online banking.

Client devices 14 each represent a computing device configured to interact with the application device 12 via the link 20. The interaction may include requesting and/or refreshing a web application on behalf of a user, displaying retrieved web applications, and transmitting requests by a user to navigate through the web application. The client device 14 may be, for example, a personal computing device with a web browser that provides the web application to the user.

Figure 2:
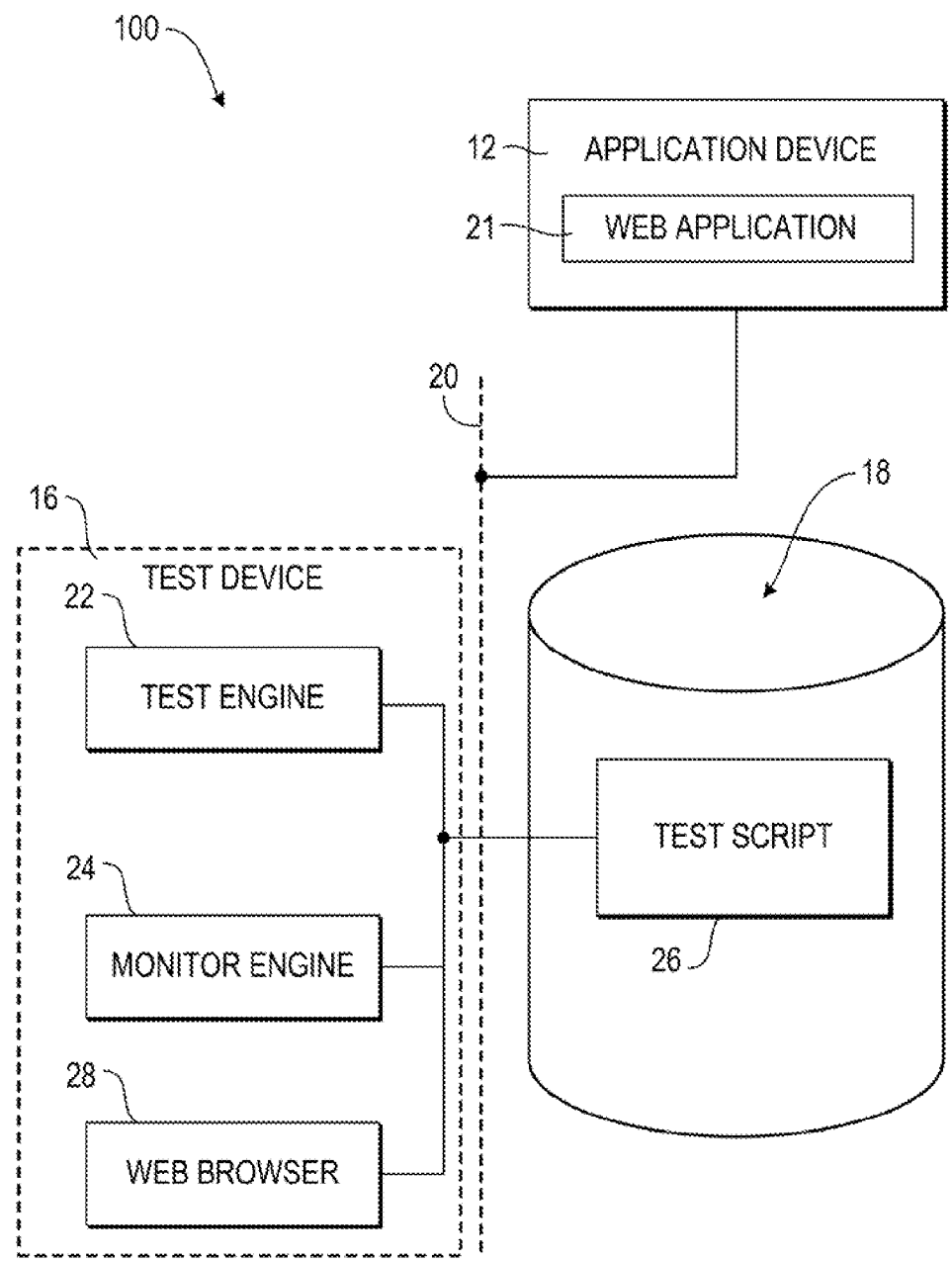
FIG. 2 illustrates a block diagram of a system according to an example.

The test device 16 represents a computing device to automatically insert a test script into a web application served by the application device 12 and rendered on a web browser. The test device 16 may include a web browser and duplicate or simulate the web browser activity of a client device 14. The test device automatically inserts the test script into the web application rendered on the web browser after a navigation occurs (i.e., a navigation is detected). The test device 16 detects the navigation by monitoring the web browser. Accordingly, the detection of the navigation is indicated by the web browser The test script may be stored in the data store 18. The data store 18 represents generally any memory configured to store data that can be accessed by the test device 16 in the performance of its function. The test device 16 functionalities may be accomplished via the link 20 that connects the test device 16 to an application device 12 having the web application and/or a client device 14 with the web browser. For example, the application device 12 and the client device 14 may provide the test device 16 with a copy of data transmitted therebetween, such that the test device 16 may duplicate or simulate the interaction between the web application 21, as shown in FIG. 2, and the client device 14 on a web browser on the test device 16. Alternatively, the application device 12 and/or the client device 14 may provide the test device 16 with the data needed to detect that a navigation in the web application is detected. In both cases, after each navigation is detected, the test device 16 may cause automatic insertion of the test script into the web application rendered on the web browser.

Link 20 represents generally one or more of a cable, wireless, fiber optic, or remote connections via a telecommunication link, an infrared link, a radio frequency link, or any other connectors or systems that provide electronic communication. Link 20 may include, at least in part, an intranet, the Internet, or a combination of both. Link 20 may also include intermediate proxies, routers, switches, load balancers, and the like.

FIG. 2 illustrates a block diagram of a system 100 to automatically insert a test script 26 into a web application 21. Referring to FIG. 2, the system 100 includes an application device 12 having at least one web application 21, a test device 16 having a test engine 22, a monitor engine 24, and a web browser 28, and a data store 18 with a test script 26. The test engine 22 represents generally any combination of hardware and/or programming to automatically insert a test script 26 into the web application 21 rendered on the web browser 28 after the navigation is detected as indicated by the web browser 28. The test engine 22 may be linked to the web browser 28 in the test device 16 to automatically provide test scripts 26 to the document context of the web application 21 rendered on the web browser 28. The test engine 22 may obtain the test script 26 from the data store 18. The data store 18 may also be linked to the web browser 28 in the test device 16.

The monitor engine 24 represents generally a combination of hardware and/or programming to monitor a web browser, such as the web browser 28 on the test device 16, to detect navigation in the web application 21 rendered on the web browser 28. The monitor engine 24 may monitor data activity within the test device 16 and/or monitor activity between the application device 12 containing the web application 21 and the web browser on the device 14 linked to the test device 16. The monitor engine 24 may communicate with the test engine 22 to indicate when, for example, navigation to a new page in the web application 21 is detected. Navigation may include detecting activity between the web browser 28 on the test device 16 and/or the client device 14 and the web application 21 such as, when a new web page is served to the web browser 28. Based on an indication that a navigation is detected, the test engine 22 of FIG. 2 causes automatic insertion of the test script 26 into the web application 21 rendered on the web browser 28 of the test device 16.

The test engine 22 and monitor engine 24 work together to automate the insertion of the test scripts 26. The automated insertion is based on navigation in the web application rendered on the web browser instead of a local testing program command or a user. This automation is facilitated by the ability to store and use the test scripts 26 globally, such as via the link 20. The automation also allows the addition of application side testing of the web application 21, such as measuring the time the application took to perform a task. Moreover, the test script 26 may also be manually inserted into the web application 21. For example, the test script 26 may be inserted manually by a user or a computing device to initialize the testing and/or to provide an update to the test script 26.

Figure 3:
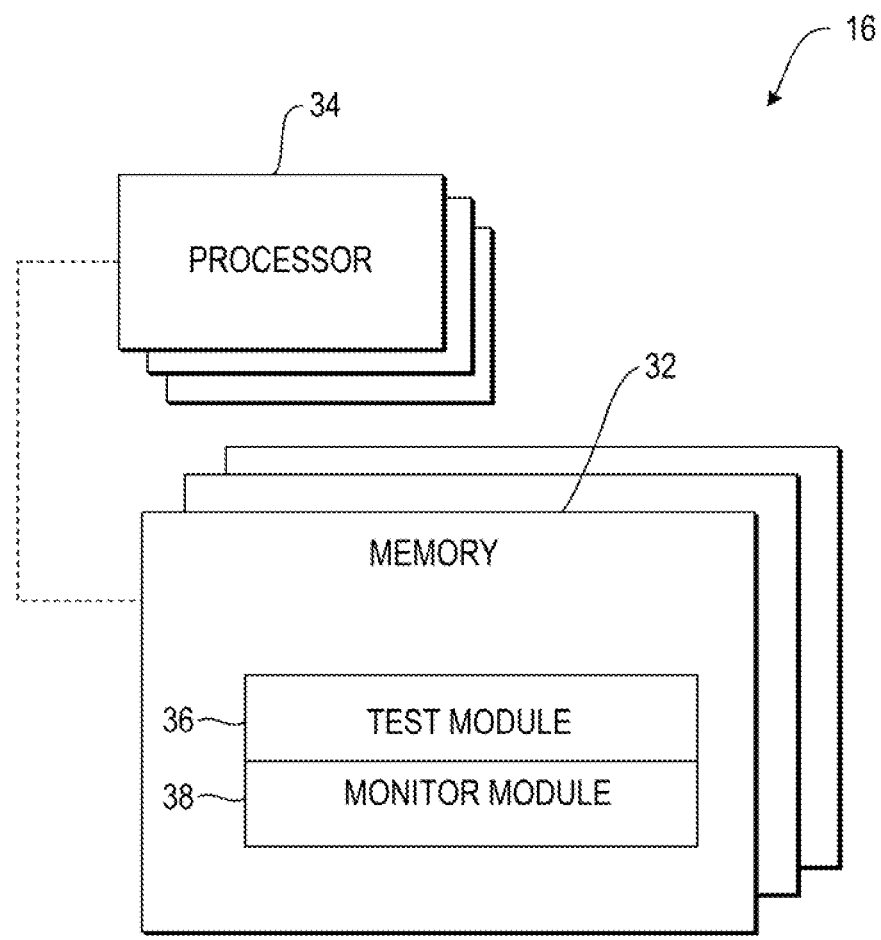
FIG. 3 illustrates a block diagram of a computer readable medium useable with a system, according to an example.

FIG. 3 is a block diagram illustrating a computer readable medium useable with the system 100 according to an example. The programming may be processor executable instructions stored on a tangible memory media 32 and the hardware may include a processor 34 to execute the instructions. The memory 32 may store program instructions that when executed by the processor 34 cause the processor to perform the program instructions. The memory 32 may be integrated in the same device as the processor 34 or it may be separate but accessible to that device and processor 34.

In some examples, the program instructions may be part of an installation package that can be executed by the processor 34 to perform a method using the system 100. The memory 32 may be a portable medium such as a CD, DVD, or flash drive or a memory maintained by a server from which the installation package can be downloaded and installed. In some examples, the program instructions may be part of an application or applications already installed, for example a web browser 28. In some examples, the memory 32 may include integrated memory such as a hard drive.

In FIG. 3, the executable program instructions stored in memory 32 are illustrated as including a test module 36 and a monitor module 38. The test module 36 represents program instructions that when, executed, by a processor cause the implementation of the test engine 22 of FIG. 2. Likewise, the monitor module 38 represents program instructions that when executed by a processor cause the implementation of the monitor engine 24 of FIG. 2.

Figure 4:
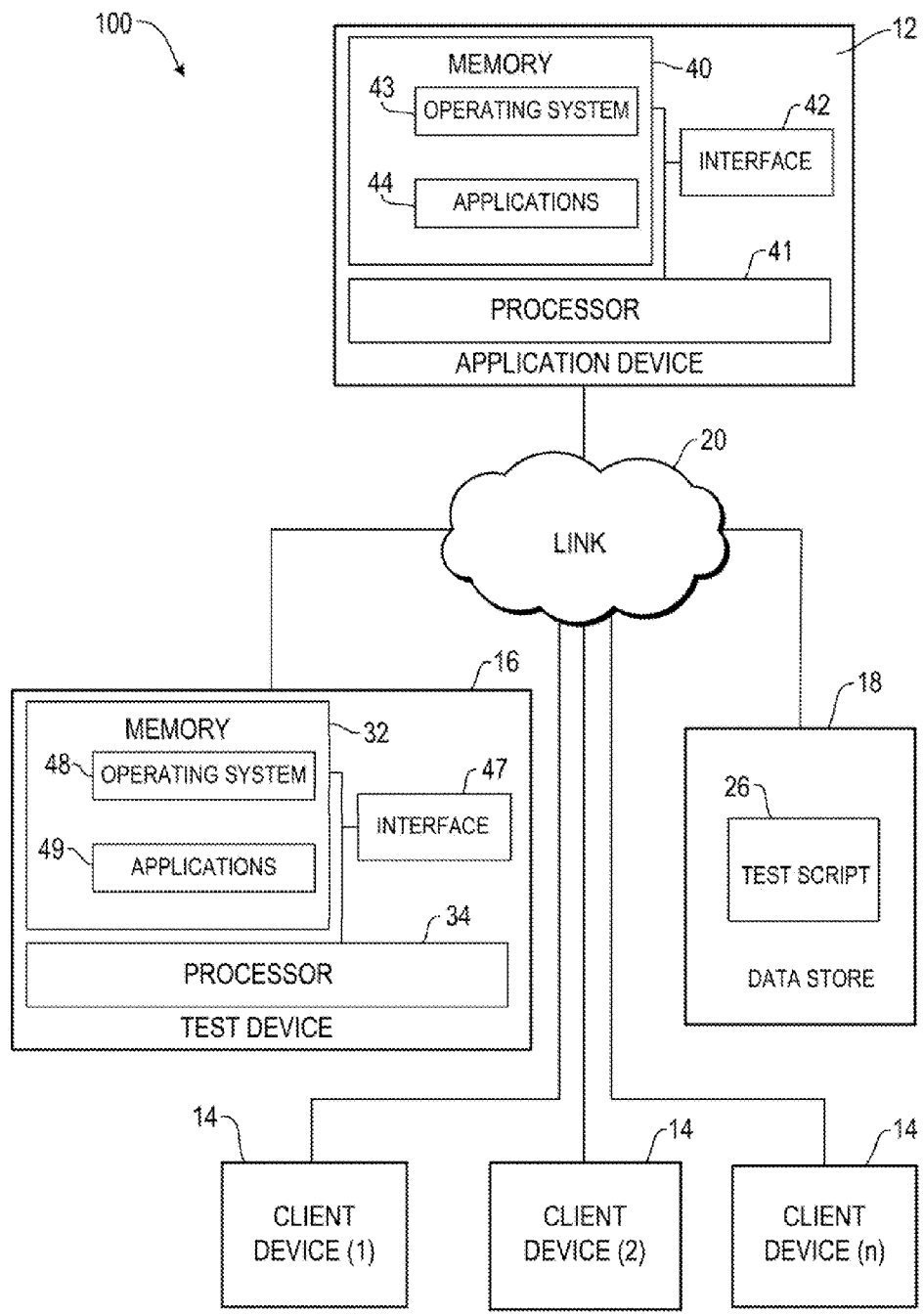
FIG. 4 illustrates a block diagram of a system according to an example.

As a further example, FIG. 4 illustrates a block diagram of the system 100 according to an example. In FIG. 4, the application device 12 is illustrated to include a memory 40, a processor 41, and an interface 42. The processor 41 represents generally any processor configured to execute program instructions stored in memory 40 to perform various specified functions. The interface 42 represents generally any interface enabling application device 12 to communicate with the client devices 14 and the test device 16 via the link 20.

The memory 40 is illustrated to include an operating system 43 and applications 44. The operating system 43 represents a collection of programs that when executed by the processor 41 serve as a platform on which applications 44 may run. Examples of operating systems 43 include various versions of Microsoft's Windows® and Linux®. Applications 44 represent program instructions that when executed by the processor 41 function as an application, such as web applications 21 (FIG. 2) served to a client device 14 and/or test device 16. In response to a request for a web application 21 by the client device 14 and/or the test device 16, the service uses the application device 12 to access a web application 21, such as a web page. The application device 12 provides the web application 21 to the requesting client device 14 and/or the test device 16.

Test device 16 is illustrated to include a memory 32, a processor 34, and an interface 47. The processor 34 represents generally any processor to execute program instructions stored in the memory 32 to perform various specified functions. The interface 47 represents generally any interface enabling the test device 16 to communicate with the application device 12 and/or client devices 14. The interface 47 may, for example, display the contents of the web browser 28 that simulates and/or duplicates the web browser activity of the client device 14.

The memory 32 is illustrated to include an operating system 48 and applications 49. The operating system 48 represents a collection of programs that when executed by the processor 34 to serve as a platform on which applications 49 may run. Examples of operating systems include various versions of Microsoft's Windows® and Linux®. Applications 49 represent program instructions that when executed by the processor 34 causes the system 100 to automatically insert a test script 26 into a web application 21 rendered on the web browser 28 as discussed above with respect to FIGS. 2-3. The applications 49 may include, for example, program instructions for the test engine 22, the monitor engine 24, and/or the web browser 28.

Referring back to FIG. 2, the test engine 22 and the monitor engine 24 are described as combinations of hardware and/or programming. The hardware portions may include the processor 34. The programming portions may include the operating system 48, applications 49, and/or combinations thereof.

Figure 5:
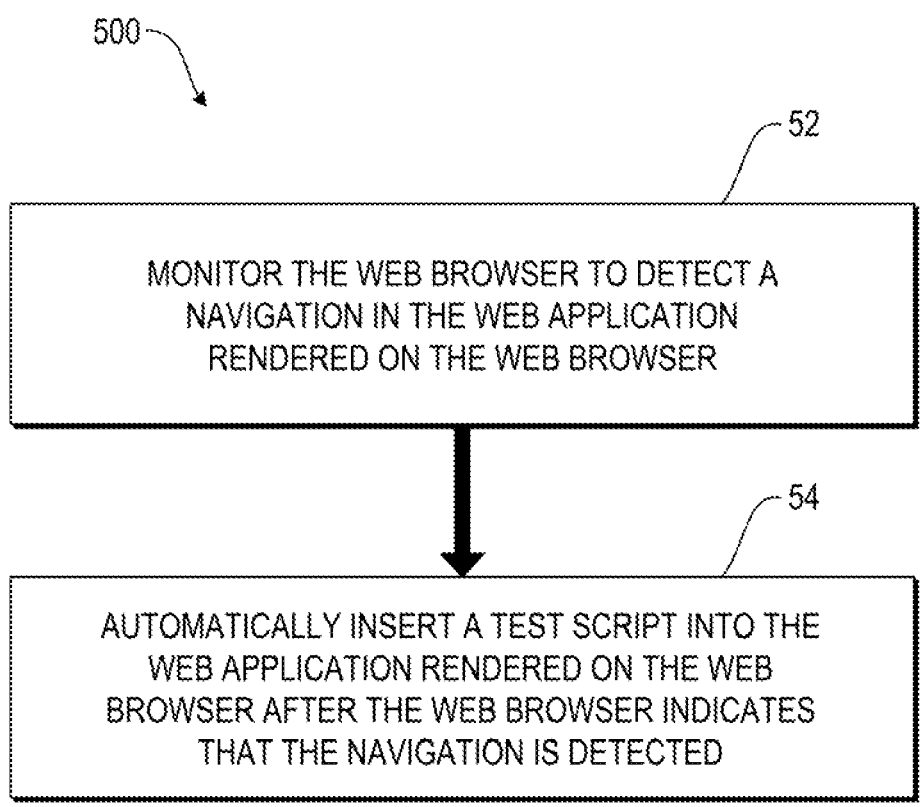
FIG. 5 illustrates a flow chart of a method to automatically insert a test script into a web application according to an example.

FIG. 5 illustrates an exemplary flow diagram 500 of a method to automatically insert a test script 26 into a web application 21. The method 500 may be used, for example, with the system 100. The testing of a web application 21 may be initialized by a user or computer program that may for example, access the test device 16 to begin testing. The initialization may also include manual insertion of a test script 26 by a user or a computing device into a web application 21 rendered on the web browser 28 of the test device 16.

The testing includes a computing device as illustrated in block 52 to monitor a web browser 28 to detect the navigation in the web application 21 rendered on the web browser 28. The test device 16 may monitor the activity between the web browser 28 on the test device 16 and/or on the client device 14 and the web application 21 to detect the navigation. For example, the test device 16, using the monitor module 38 and/or the monitor engine 24, may monitor the data activity between the web application 21 and the web browser 28 on the test device 16 to detect a navigation in the web application 21 rendered on the web browser 28 as indicated by the web browser 28. The navigation may be a duplication or simulation of an action of a user on a client device 14, such as a user requesting access to a new web page, accessing a different page or area of a web site, and/or refreshing a web page.

In block 54, the computing device automatically inserts a test script 26 into the web application 21 rendered on the web browser 28 after the navigation is detected as indicated by the web browser 28. The test script 26 may be inserted into a document context of the web application 21. For example, a test script may be added to the document's context in Internet Explorer® using JavaScript's eval functionality with the test script 26. Alternatively, in Firefox®, the testing may be implemented by initially registering an event handler for a predetermined event. The handler will use eval functionalities on a JavaScript it receives. The result of the eval functionality is stored globally. The predetermined event may be fired with a parameter of the test script 26, and Firefox's® sandbox may be used to retrieve the globally stored result of the eval functionality. Referring to FIGS. 1-4, the test script 26 may be run by the test device 16, using for example, the test module 36 and/or the test engine 22. The test script 26 may be stored in a data store 18, such that the data store 18 has a connection to the test device 16. As discussed above the computing device may allow a user or a computing device to manually insert the test script 26 into web applications 21 in select circumstances, such as initializing a test. Otherwise, the test script 26 is automatically inserted into the web application 21 rendered on the web browser 28 after a navigation is detected.

The detection of a navigation (block 52) in the web application 21 causes the automatic insertion of the test script 26 (block 54) into the duplicated or simulated copy of the web application 21 rendered on the web browser 28 of the test device 16. The test device 16 does not need to be informed of an impending navigation; however, the detection of the occurrence or completion of a navigation causes the test script 26 to be automatically inserted into the web application 21 rendered on the web browser 28 of the test device 16.

FIGS. 1-5 aid in illustrating the architecture, functionality, and operation according to examples. The examples illustrate various physical and logical components. The various components illustrated are defined at least in part as programs, programming, or program instructions. Each such component, portion thereof, or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s).

Examples can be realized in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media such as, for example, electronic, magnetic, optical, electromagnetic, or semiconductor media. More specific examples of suitable computer-readable media include, but are not limited to, a portable magnetic computer diskette such as floppy diskettes or hard drives, a random access memory (RAM), a read-only memory (ROM), an erasable programmable read-only memory, or a portable compact disc.

Although the flow diagram of FIG. 5 illustrates specific orders of execution, the order of execution may differ from that which is illustrated. For example, the order of execution of the blocks may be scrambled relative to the order shown. Also, the blocks shown in succession may be executed concurrently or with partial concurrence. All such variations are within the scope of the present invention.

The present disclosure has been described using non-limiting detailed descriptions of examples thereof and is not intended to limit, the scope of the present disclosure. It should be understood that features and/or operations described with respect to one example may be used with other examples and that not all examples of the present disclosure have all of the features and/or operations illustrated in a particular figure or described with respect to one of the examples. Variations of examples described will occur to persons of the art. Furthermore, the terms "comprise," "include," "have" and their conjugates, shall mean, when used in the present disclosure and/or claims, "including but not necessarily limited to."

It is noted that some of the above described examples may include structure, acts or details of structures and acts that may not be essential to the present disclosure and are intended to be exemplary. Structure and acts described herein are replaceable by equivalents, which perform the same function, even if the structure or acts are different, as known in the art. Therefore, the scope of the present disclosure is limited only by the elements and limitations as used in the claims.

What is claimed is:

1. A method comprising:
rendering a web application in a test browser executing on a test device, the web application being served from a web application server separate from the test device;
accessing a data store to obtain a performance test script, the data store being separate from the test device and the web application server;
detecting a navigation in the web application rendered in a client browser executing on a client device in communication with the web application server, said client device being separate from the test device, the server, and the data store;
in response to the detecting, automatically inserting the performance test script in a document context of the web application as rendered in the test browser; and measuring the performance of the web application as rendered in the test browser by executing the performance test script on the test device.

2. A method as recited in claim 1 further comprising:
at least one of the web application server and the client device providing a copy of data transmitted between the web application and the client device to the test device; and
duplicating or simulating on the test device an interaction between the web application server and the client device based on the copy of data.

3. A computer program product comprising non-transitory computer-readable storage media encoded with code that, when executed by a processor, causes the processor to implement a method including:
rendering a web application in a test browser executing on a test device, the web application being served from a web application server separate from the test device;
accessing a data store to obtain a performance test script, the data store being separate from the test device and the web application server;
detecting a navigation in the web application rendered in a client browser executing on a client device in communication with the web application server, said client device being separate from the test device, the server, and the data store;

in response to the detecting, automatically inserting the performance test script in a document context of the web application as rendered in the test browser; and measuring the performance of the web application as rendered in the test browser by executing the performance test script on the test device.

4. A computer program product as recited in claim 3 wherein the method further includes:

at least one of the web application server and the client device providing a copy of data transmitted between the web application and the client device to the test device; and duplicating or simulating an interaction between the web application server and the client device based on the copy of data.

5. A test device comprising:

a processor;

a test browser to render a web application served by a web application server separate from the test device;

a monitor engine to detect navigation in the web application as rendered by a client browser executing on a client device separate from the test device and the web application server; and a test engine to access a data server to obtain a performance test script, and to, in response to a detection provided by the monitor engine, insert the performance test script into a document context of the web application as rendered in the test browser so that the performance test script is executed to measure the performance of the web application.

6. A test device as recited in claim 5 wherein the test browser is configured to duplicate or simulate an interaction between the web application server and the client browser based on a copy of data received by the test device from at least one of the web application server and the client device.

* * * * *